United States Patent
Wang et al.

(10) Patent No.: US 11,246,109 B2
(45) Date of Patent: Feb. 8, 2022

(54) RESYNCHRONIZATION TRIGGER METHOD AND BASE STATION

(71) Applicant: Huawei Technologies Co., Ltd., Shenzhen (CN)

(72) Inventors: Xu Wang, Shanghai (CN); Zhaodi Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 16/706,375

(22) Filed: Dec. 6, 2019

(65) Prior Publication Data
US 2020/0145948 A1 May 7, 2020

Related U.S. Application Data

(63) Continuation of application No. PCT/CN2018/090035, filed on Jun. 6, 2018.

(30) Foreign Application Priority Data

Jun. 8, 2017 (CN) .......................... 201710427444.7

(51) Int. Cl.
*H04W 56/00* (2009.01)
*H04L 5/00* (2006.01)
*H04W 74/00* (2009.01)

(52) U.S. Cl.
CPC .......... *H04W 56/001* (2013.01); *H04L 5/001* (2013.01); *H04L 5/0053* (2013.01);
(Continued)

(58) Field of Classification Search
CPC .......... H04W 56/001; H04W 56/0005; H04W 74/00; H04L 5/001; H04L 5/0053; H04L 5/0098

See application file for complete search history.

(56) References Cited

U.S. PATENT DOCUMENTS

| | | | | |
|---|---|---|---|---|
| 2012/0082107 A1* | 4/2012 | Ou | ................... | H04W 74/0833 370/329 |
| 2012/0147873 A1 | 6/2012 | Cheng et al. | | |

(Continued)

FOREIGN PATENT DOCUMENTS

| CN | 101998615 A | 3/2011 |
|---|---|---|
| CN | 102227939 A | 10/2011 |

(Continued)

OTHER PUBLICATIONS

Qualcomm Incorporated, "Reconfiguration messages and HS-SSCH orders interaction", Reconfiguration messages and HS-SCCH orders interaction for DTX/DRX, 3GPP TSG-RAN2#73, R2-110406, Taipei, Taiwan, Feb. 21-25, 2011. total 4 pages.

(Continued)

*Primary Examiner* — Kevin C. Harper
(74) *Attorney, Agent, or Firm* — Slater Matsil, LLP

(57) ABSTRACT

A method includes: triggering, by a base station, resynchronization immediately after an uplink secondary carrier cell SCC is activated, where a triggering moment of the resynchronization is T1; and detecting, by the base station, whether a resynchronization feedback signal is received within a preset time range, and if not, triggering resynchronization, where a start moment of the preset time range is T1, an end moment of the preset time range is T2, and a difference between T2 and T1 is less than or equal to 30 milliseconds. The base station triggers resynchronization immediately after the uplink secondary carrier cell SCC is activated.

9 Claims, 3 Drawing Sheets

(52) U.S. Cl.
CPC ....... *H04L 5/0098* (2013.01); *H04W 56/0005* (2013.01); *H04W 74/00* (2013.01)

(56) References Cited

U.S. PATENT DOCUMENTS

| | | | |
|---|---|---|---|
| 2012/0281680 A1* | 11/2012 | Bostrom | H04W 72/0446 370/336 |
| 2013/0100938 A1 | 4/2013 | Kwon et al. | |
| 2013/0188612 A1 | 7/2013 | Dinan | |
| 2013/0242891 A1* | 9/2013 | Ye | H04W 74/0833 370/329 |
| 2013/0258995 A1 | 10/2013 | Skov et al. | |
| 2014/0179331 A1 | 6/2014 | Futaki | |
| 2015/0146701 A1 | 5/2015 | Futaki | |
| 2015/0341885 A1 | 11/2015 | Sebire et al. | |
| 2017/0118606 A1 | 4/2017 | De Foy et al. | |

FOREIGN PATENT DOCUMENTS

| | | |
|---|---|---|
| CN | 102244927 A | 11/2011 |
| CN | 102780998 A | 11/2012 |
| CN | 102918897 A | 2/2013 |
| CN | 103733700 A | 4/2014 |
| CN | 107196750 A | 9/2017 |
| EP | 2739099 A1 | 6/2014 |
| JP | 2013545328 A | 12/2013 |
| WO | 2012040907 A1 | 4/2012 |

OTHER PUBLICATIONS

ZTE, "Time Alignment Timer Management", 3GPP TSG-RAN WG2 Meeting #75bis R2-114944, Zhuhai, China, Oct. 10-14, 2011, total 3 pages.

3GPP TS 36.133 V14.3.0 (Mar. 2017), 3rd Generation Partnership Project; Technical Specification Group Radio Access Network; Evolved Universal Terrestrial Radio Access (E-UTRA); Requirements for support of radio resource management (Release 14), Mar. 2017.

CATT, "PUCCH SCell activation", 3GPP TSG-RAN WG2 #91, R2-153509, Beijing, China, Aug. 24-28, 2015, 4 pages.

LG Electronics Inc., "Remaining issue on TAG for CA enhancement", 3GPP TSG-RAN WG2#91, R2-153154, Beijing, China, Aug. 24-28, 2015, 2 pages.

Institute for Information Industry (III), "Reducing use delay on PUCCH Scell", 3GPP TSG-RAN WG2#91, R2-153415, Beijing, China, Aug. 24-28, 2015, 3 pages.

Srinivas Ramanathan et al., "Adaptive Feedback Techniques for Synchronized Multi Media Retrieval Over Integrated Networks", XP000385474, IEEE/ACM Transactions on Networking, Apr. 1, 1993, No. 2, New York, US, pp. 246-259.

* cited by examiner

RESYNCHRONIZATION TRIGGER METHOD AND BASE STATION

CROSS-REFERENCE TO RELATED APPLICATIONS

This application is a continuation of International Application No. PCT/CN2018/090035, filed on Jun. 6, 2018, which claims priority to Chinese Patent Application No. 201710427444.7, filed on Jun. 8, 2017. The disclosures of the aforementioned applications are hereby incorporated by reference in their entireties.

TECHNICAL FIELD

This application relates to the communications field, and in particular, to a resynchronization trigger method and a base station.

BACKGROUND

As a carrier aggregation (CA) technology becomes increasingly mature, more requirements are posed on an uplink CA technology. To ensure demodulation performance of uplink CA, a base station sends a timing advance (TA) to a terminal. The terminal maintains uplink synchronization based on the TA. In an uplink CA scenario, the terminal may send uplink data in a plurality of cells, but TAs of the plurality of cells may be different. Therefore, the terminal may need to maintain multiple timing advances (MTAs) at a same time.

In the current system, when MTAs are enabled, a base station triggers resynchronization 30 milliseconds later after an uplink secondary carrier cell (SCC) is activated. A relatively long time elapses before the base station triggers resynchronization, and consequently, an uplink throughput is reduced

SUMMARY

Embodiments of this application provide a resynchronization trigger method and a base station, to resolve a problem of uplink throughput reduction caused by an existing resynchronization trigger method.

To achieve the foregoing objective, this application provides the following technical solutions.

A first aspect of this application provides a resynchronization trigger method, including: triggering, by a base station, resynchronization immediately after an uplink secondary carrier cell SCC is activated, where a triggering moment of the resynchronization is T1; and detecting, by the base station, whether a resynchronization feedback signal is received within a preset time range, and if not, triggering resynchronization, where a start moment of the preset time range is T1, an end moment of the preset time range is T2, and a difference between T2 and T1 is less than or equal to 30 milliseconds. The base station triggers resynchronization immediately after the uplink secondary carrier cell SCC is activated. Therefore, a delay time for triggering resynchronization can be reduced, thereby increasing an uplink throughput. In addition, if no resynchronization feedback signal is received within the preset time range, the base station re-triggers resynchronization. Therefore, different terminals can be supported, and this ensures that the terminals can correctly demodulate a physical downlink control channel command.

A second aspect of this application provides a base station, including: a processor, configured to trigger resynchronization immediately after an uplink secondary carrier cell SCC is activated; and detect whether a resynchronization feedback signal is received within a preset time range, and if not, trigger resynchronization, where a triggering moment of the resynchronization is T1, a start moment of the preset time range is T1, an end moment of the preset time range is T2, and a difference between T2 and T1 is less than or equal to 30 milliseconds. Therefore, the base station can increase an uplink throughput in CA.

A third aspect of this application provides a base station, including a resynchronization module and a detection module. The resynchronization module is configured to trigger resynchronization immediately after an uplink secondary carrier cell SCC is activated, where a triggering moment of the resynchronization is T1. The detection module is configured to detect whether a resynchronization feedback signal is received within a preset time range. The resynchronization module is further configured to: if the detection module does not receive a resynchronization feedback signal within the preset time range, trigger resynchronization, where a start moment of the preset time range is T1, an end moment of the preset time range is T2, and a difference between T2 and T1 is less than or equal to 30 milliseconds. Therefore, the base station can increase an uplink throughput in CA.

In an implementation, the detecting, by the base station, whether a resynchronization feedback signal is received within a preset time range, and if not, triggering resynchronization includes: detecting, by the base station based on a preset period, whether a resynchronization feedback signal is received within the preset time range, and if not, triggering resynchronization, until a current moment t1 does not belong to the preset time range.

In an implementation, the detecting, by the base station, whether a resynchronization feedback signal is received within a preset time range, and if not, triggering resynchronization includes: detecting, by the base station at a moment t2 in the preset time range, whether a resynchronization feedback signal is received, and if not, re-initiating a resynchronization request, where t2<T2; and detecting, by the base station at the moment T2, whether a resynchronization feedback signal is received, and if not, initiating a resynchronization request for a last time. In this mechanism, resynchronization is sent for three times. This can save resources while increasing an uplink throughput.

A fourth aspect of this application provides a computer readable storage medium, where the computer readable storage medium stores an instruction, and when the instruction is run on a computer, the computer is enabled to perform the foregoing resynchronization trigger method.

A fifth aspect of this application provides a computer program product including an instruction, where when the computer program product is run on a computer, the computer is enabled to perform the foregoing resynchronization trigger method.

A sixth aspect of this application provides a chip system, including a processor, configured to perform the foregoing resynchronization trigger method.

DETAILED DESCRIPTION OF ILLUSTRATIVE EMBODIMENTS

A resynchronization trigger method disclosed in embodiments of this application is applied to a scenario in which MTAs are enabled. Specifically, the scenario in which MTAs are enabled may be a non-co-coverage (e.g., where two cells cover different areas) scenario in CA or may be a co-coverage (e.g., where two cells cover a same area) scenario in CA.

In this embodiment, CA may be aggregation of two uplink carriers, or may be aggregation of N (where N is an integer greater than 2) uplink carriers.

In an existing protocol, a reason why a base station triggers resynchronization 30 milliseconds later after an uplink SCC is activated is as follows: Different terminals have different demodulation performance; antennas of some terminals cannot work immediately after the uplink SCC is activated; and the existing protocol specifies that an antenna startup delay time is 34 milliseconds, and correspondingly, the existing protocol specifies that the base station triggers resynchronization 30 milliseconds later after the uplink SCC is activated.

However, it is found that in a research process that if a base station triggers resynchronization immediately after an uplink SCC is activated, a probability that an existing terminal can correctly demodulate a resynchronization signal, that is, a physical downlink control channel order (PDCCH order), can reach 80%.

Based on the foregoing finding, this application provides a resynchronization trigger method, to reduce a resynchronization trigger delay time without reducing demodulation performance of a terminal, thereby increasing a throughput in uplink CA.

Figure 1:
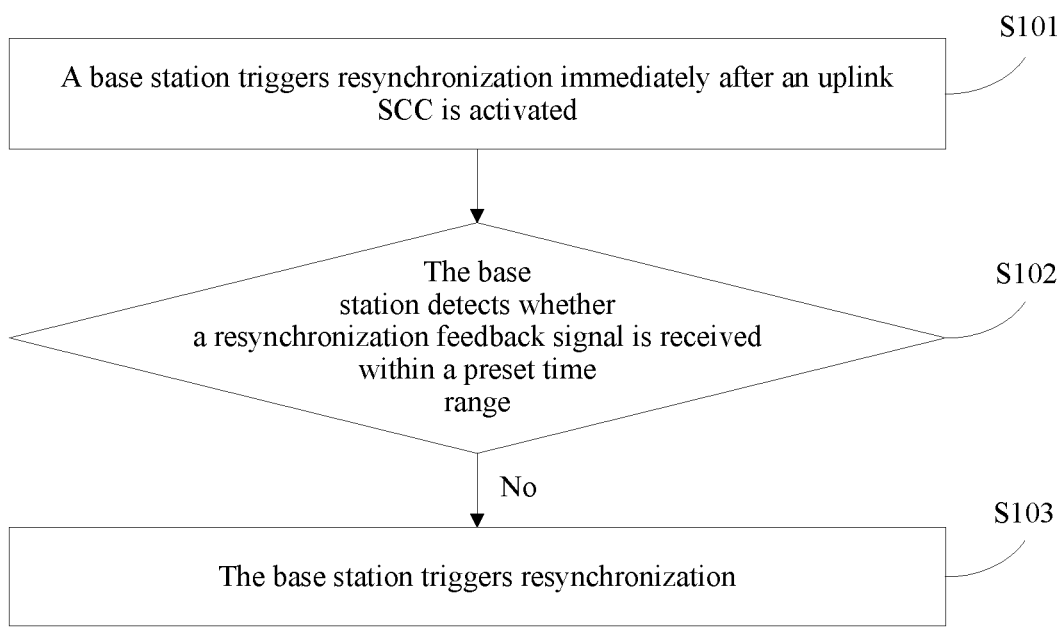
FIG. 1 is a flowchart of a resynchronization trigger method disclosed in an embodiment of this application.

FIG. 1 shows a resynchronization trigger method disclosed in an embodiment of this application. The method includes the following steps.

S101: A base station triggers resynchronization immediately after an uplink SCC is activated.

Based on the foregoing finding, if resynchronization is triggered immediately after the uplink SCC is activated, most terminals can correctly demodulate a PDCCH order. Considering that some terminals cannot correctly demodulate the PDCCH order, the following step is performed to improve demodulation accuracy of the terminals.

S102. The base station detects whether a resynchronization feedback signal is received within a preset time range, and if not, triggers resynchronization. If yes, the base station performs a subsequent step specified in an existing protocol. Details are not described herein.

Specifically, a start moment of the preset time range is a moment T1 at which the resynchronization is triggered in Slot, an end moment of the preset time range is T2, and a difference T2-T1 between T2 and T1 may be 30 milliseconds or less than 30 milliseconds.

The resynchronization feedback signal is a preamble signal sent by a terminal.

Optionally, the base station may perform S102 based on a preset period until a current moment t1 does not belong to the preset time range.

Figure 2:
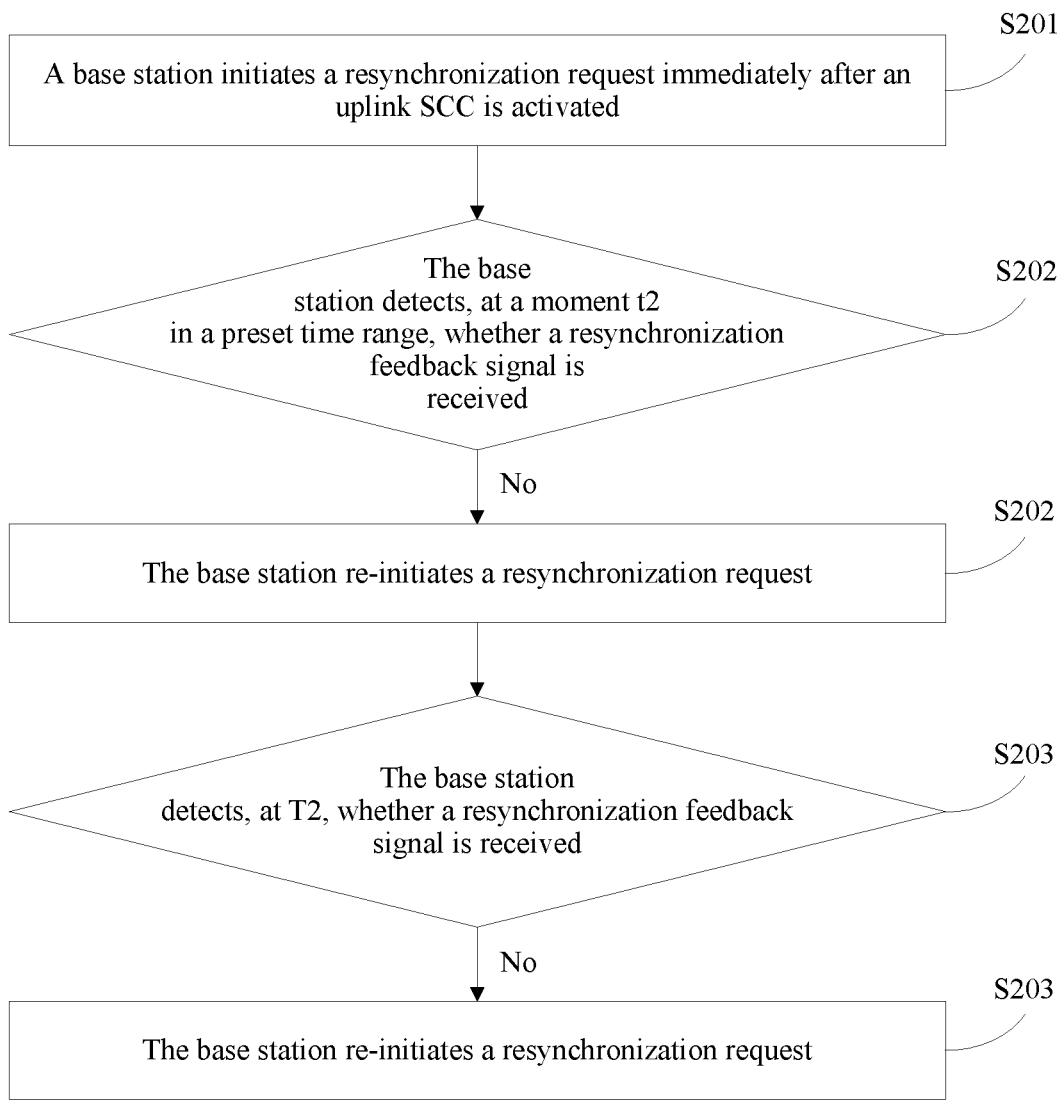
FIG. 2 is a flowchart of another resynchronization trigger method disclosed in an embodiment of this application.

Alternatively, to reduce energy consumption and save resources, a base station may trigger resynchronization according to the process shown in FIG. 2. In FIG. 2, S202 and S203 are a specific implementation of S102.

S201: The base station initiates a resynchronization request immediately after an uplink SCC is activated.

S202: The base station detects, at a moment t2 (where t2<T2) in the preset time range, whether a resynchronization feedback signal is received, and if not, re-initiates a resynchronization request.

S203. The base station detects, at the moment T2, whether a resynchronization feedback signal is received, and if not, initiates a resynchronization request for a last time.

It can be learned from FIG. 1 and FIG. 2 that in the resynchronization trigger method disclosed in the embodiments of this application, the base station initiates resynchronization for a first time at better timing. To be specific, the base station initiates the resynchronization request immediately after the uplink SCC is activated. This mechanism can ensure that most terminals can correctly demodulate the PDCCH order. For a terminal that cannot correctly demodulate the PDCCH order, the base station re-triggers resynchronization before a maximum delay time elapses, to ensure that performance of the terminal is not affected because timing at which the resynchronization is initiated for the first time is changed.

Optionally, the base station may not perform S203. In other words, the base station performs detection only at the moment T2, and if no resynchronization feedback signal is received, re-initiates a resynchronization request.

It should be noted that, in actual application, the step shown in S101 may be flexibly adjusted based on an actual requirement by taking both PDCCH order demodulation accuracy of terminals and resource consumption into consideration.

Figure 3:
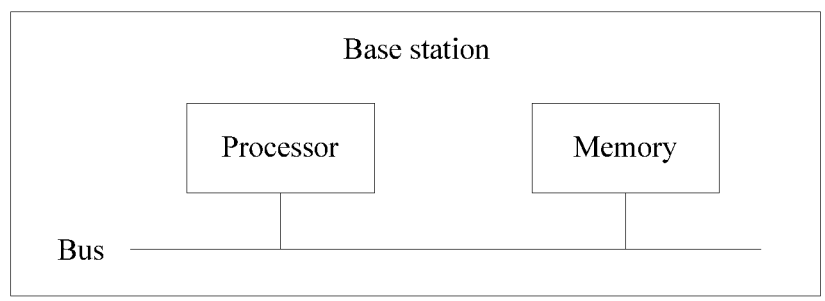
FIG. 3 is a schematic structural diagram of a base station disclosed in an embodiment of this application.

FIG. 3 shows a base station disclosed in an embodiment of this application. The base station includes a processor, and optionally, further includes a memory.

The processor is configured to trigger resynchronization immediately after an uplink secondary carrier cell SCC is activated, where a triggering moment of the resynchronization is T1; and detect whether a resynchronization feedback signal is received within a preset time range, and if not, trigger resynchronization, where a start moment of the preset time range is T1, an end moment of the preset time range is T2, and a difference between T2 and T1 is less than or equal to 30 milliseconds.

For a specific implementation process of the functions of the processor, refer to the foregoing method embodiment. Details are not described herein again.

The memory is configured to store an application program used to implement the functions of the processor and store data generated in a running process of the application program.

The base station shown in FIG. 3 initiates a resynchronization request immediately after the uplink SCC is activated, and if the base station does not receive a resynchronization feedback, the base station re-sends a resynchronization request at most 30 milliseconds later. Therefore, this can increase a throughput in uplink CA while ensuring correct demodulation by a terminal.

Figure 4:
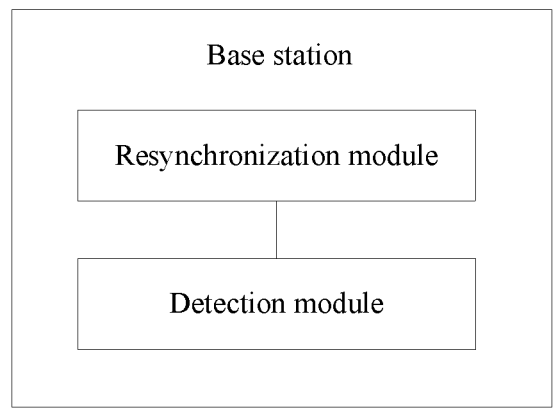
FIG. 4 is a schematic structural diagram of another base station disclosed in an embodiment of this application.

FIG. 4 shows a base station disclosed in an embodiment of this application. The base station includes a resynchronization module and a detection module.

The resynchronization module is configured to trigger resynchronization immediately after an uplink secondary carrier cell SCC is activated, where a triggering moment of the resynchronization is T1. The detection module is configured to detect whether a resynchronization feedback signal is received within a preset time range. The resynchronization module is further configured to: if the detection module does not receive a resynchronization feedback signal within the preset time range, trigger resynchronization, where a start moment of the preset time range is T1, an end moment of the preset time range is T2, and a difference between T2 and T1 is less than or equal to 30 milliseconds.

Specifically, the detection module may periodically detect whether a resynchronization feedback signal is received within the preset time range.

Alternatively, the detection module detects, at a moment t2 in the preset time range, whether a resynchronization feedback signal is received, and if not, detect, at the moment T2, whether a resynchronization feedback signal is received, where t2<T2.

If the detection module does not receive a resynchronization feedback signal at the moment t2, the resynchronization module re-initiates a resynchronization request; and if the detection module does not receive a resynchronization feedback signal at the moment T2, the resynchronization module initiates a resynchronization request for a last time.

Therefore, the base station shown in FIG. 4 can increase a throughput in uplink CA while ensuring correct demodulation by a terminal. Further, a mechanism in which three resynchronization requests are initiated is used, to save resources while increasing a throughput.

What is claimed is:

1. A method, comprising:
    triggering, by a base station at a triggering moment T1, resynchronization of an uplink secondary carrier cell (SCC) in response to the uplink SCC being activated; and
    periodically detecting, by the base station in a preset time range, whether a resynchronization feedback signal is received within the preset time range, and for each periodical detection, in response to determining that a resynchronization feedback signal is not received, re-triggering resynchronization of the uplink SCC, wherein the periodical detection is performed according to a preset period until a resynchronization feedback signal is received or a current moment is not within the preset time range, wherein a start moment of the preset time range is the triggering moment T1, an end moment of the preset time range is a moment T2, and a difference between the moment T2 and the triggering moment T1 is less than or equal to 30 milliseconds.

2. The method according to claim 1, wherein triggering, by the base station at the triggering moment T1, the resynchronization in response to the uplink SCC being activated comprises triggering the resynchronization immediately after the uplink SCC is activated.

3. The method according to claim 2, wherein triggering the resynchronization immediately after the uplink SCC is activated comprises triggering the resynchronization within a preset time period of the uplink SCC being activated, wherein the preset time period is less than 30 milliseconds.

4. A base station, comprising:
    a processor, configured to:
        trigger, at a triggering moment T1, resynchronization of an uplink secondary carrier cell (SCC) in response to the uplink SCC being activated;
        detect, at a moment t2 in a preset time range, whether a resynchronization feedback signal is received;
        in response to the resynchronization feedback signal not being received by the moment t2, re-trigger resynchronization of the uplink SCC;
        detect, at a moment T2 in the preset time range, whether a resynchronization feedback signal is received; and
        in response to the resynchronization feedback signal not being received by the moment T2, trigger resynchronization of the uplink SCC, wherein a start moment of the preset time range is the triggering moment T1, an end moment of the preset time range is a moment T2, and a difference between the moment T2 and the triggering moment T1 is less than or equal to 30 milliseconds.

5. The base station according to claim 4, wherein the processor is configured to trigger the resynchronization of the uplink SCC immediately after the uplink SCC is activated.

6. The base station according to claim 5, wherein the processor is configured to trigger the resynchronization of the uplink SCC within a preset time period of the uplink SCC being activated, wherein the preset time period is less than 30 milliseconds.

7. A non-transitory computer readable storage medium, wherein the non-transitory computer readable storage medium stores an instruction, and when the instruction is run on a computer, the computer is enabled to perform:
    triggering, at a triggering moment T1, resynchronization of an uplink secondary carrier cell (SCC) in response to the uplink SCC being activated;
    detecting, at a moment t2 in a preset time range, whether a resynchronization feedback signal is received;
    in response to the resynchronization feedback signal not being received by the moment t2, re-trigger resynchronization of the uplink SCC;
    detect, at a moment T2 in the preset time range, whether a resynchronization feedback signal is received; and
    in response to the resynchronization feedback signal not being received by the moment T2, triggering resynchronization of the uplink SCC, wherein a start moment of the preset time range is the triggering moment T1, an end moment of the preset time range is a moment T2, and a difference between the moment T2 and the triggering moment T1 is less than or equal to 30 milliseconds.

8. The non-transitory computer readable storage medium according to claim 7, wherein the instruction enables the computer to perform:
    triggering the resynchronization immediately after the uplink SCC is activated.

9. The non-transitory computer readable storage medium according to claim 8, wherein the instruction enables the computer to perform:
    triggering the resynchronization within a preset time period of the uplink SCC being activated, wherein the preset time period is less than 30 milliseconds.

* * * * *